US011200809B2

(12) United States Patent
Batra et al.

(10) Patent No.: US 11,200,809 B2
(45) Date of Patent: Dec. 14, 2021

(54) UNMANNED VEHICLE PROXIMITY WARNING SYSTEM

(71) Applicant: Honeywell International Inc., Morris Plains, NJ (US)

(72) Inventors: Ajay Batra, Hyderabad (IN); Laveen Vikram Sundararaj, Hyderabad (IN); Charan Ebsv, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/436,785

(22) Filed: Jun. 10, 2019

(65) Prior Publication Data

US 2019/0293786 A1 Sep. 26, 2019

Related U.S. Application Data

(63) Continuation of application No. 15/247,555, filed on Aug. 25, 2016, now Pat. No. 10,345,441.

(51) Int. Cl.
| | | |
|---|---|---|
| *G01S 13/91* | (2006.01) | |
| *G08G 5/00* | (2006.01) | |
| *G08G 5/04* | (2006.01) | |
| *G01S 13/933* | (2020.01) | |
| *G01S 5/00* | (2006.01) | |

(Continued)

(52) U.S. Cl.
CPC .......... *G08G 5/0008* (2013.01); *G01S 5/0072* (2013.01); *G01S 5/0289* (2013.01); *G01S 13/933* (2020.01); *G01S 13/953* (2013.01); *G08G 5/0013* (2013.01); *G08G 5/0021* (2013.01); *G08G 5/0026* (2013.01);

(Continued)

(58) Field of Classification Search
CPC ...... G01S 13/91; G01S 13/933; G01S 13/953; G01S 5/0072; G01S 5/0289; G08G 5/0008; G08G 5/0013; G08G 5/0021; G08G 5/0026; G08G 5/0069; G08G 5/045; H04B 1/38
See application file for complete search history.

(56) References Cited

U.S. PATENT DOCUMENTS

| | | |
|---|---|---|
| 6,208,284 B1 | 3/2001 | Woodell et al. |
| 7,932,853 B1 | 4/2011 | Woodell et al. |

(Continued)

FOREIGN PATENT DOCUMENTS

EP 2674723 A2 12/2013

OTHER PUBLICATIONS

Partial Search Report from counterpart European Application No. 17185203.1, dated Oct. 27, 2017, 16 pp.

(Continued)

*Primary Examiner* — Timothy A Brainard
(74) *Attorney, Agent, or Firm* — Shumaker & Sieffert, P.A.

(57) ABSTRACT

A traffic control system is described that comprises a transceiver configured to receive a first signal comprising location data indicating a location of an unmanned vehicle (UV). The traffic control system further comprises a processor configured to determine a location of a second vehicle and determine a course of the second vehicle. The processor is further configured to cause, based on determining the location of the second vehicle and the course of the second vehicle, the transceiver to transmit a second signal to the UV directing the UV to avoid the course of the second vehicle.

20 Claims, 5 Drawing Sheets

(51) Int. Cl.
  *G01S 5/02* (2010.01)
  *G01S 13/95* (2006.01)
  *H04B 1/38* (2015.01)
(52) U.S. Cl.
  CPC ........... *G08G 5/0069* (2013.01); *G08G 5/045* (2013.01); *H04B 1/38* (2013.01)

(56) References Cited

U.S. PATENT DOCUMENTS

| | | | |
|---|---|---|---|
| 8,344,933 | B1 | 1/2013 | Kronfeld et al. |
| 8,576,112 | B2 | 11/2013 | Garrec et al. |
| 9,129,520 | B2 | 9/2015 | Limbaugh et al. |
| 9,489,813 | B1* | 11/2016 | Beigel ..................... G01S 5/12 |
| 9,508,263 | B1 | 11/2016 | Teng |
| 2006/0253254 | A1 | 11/2006 | Herwitz |
| 2009/0067670 | A1 | 3/2009 | Johnson |
| 2010/0121575 | A1 | 5/2010 | Aldridge et al. |
| 2010/0131121 | A1 | 5/2010 | Gerlock |
| 2014/0249693 | A1* | 9/2014 | Stark ..................... B64D 47/02 701/2 |
| 2015/0204974 | A1* | 7/2015 | Pillay ..................... G01S 7/003 342/25 A |
| 2015/0236409 | A1 | 8/2015 | Stayton |
| 2016/0035224 | A1* | 2/2016 | Yang ..................... G08G 5/0078 701/23 |
| 2016/0217562 | A1 | 7/2016 | Ulman |
| 2016/0275801 | A1 | 9/2016 | Kopardekar |
| 2016/0292403 | A1* | 10/2016 | Gong ..................... G08G 5/0078 |
| 2017/0069214 | A1 | 3/2017 | Dupray et al. |
| 2017/0178352 | A1 | 6/2017 | Harmsen et al. |
| 2017/0227962 | A1* | 8/2017 | Cesarano ........... H04B 7/18506 |
| 2017/0227968 | A1 | 8/2017 | Klinger et al. |

OTHER PUBLICATIONS

Response to Extended Search Report dated Jan. 30, 2018, from counterpart European Application No. 17185203.1, filed May 18, 2018, 10 pp.

Moses, "Radar-Based Detection and Identification for Miniature Air Vehicles", Sep. 28-30, 2011, IEEE International Conference on Control Applications, 933-940 (Year: 2011).

"Airspace Intelligence, The low-altitude airspace management solution for unmanned aircraft," retrieved from https://www.airmap.com/ on Aug. 25, 2016, 4 pp.

"The Drone Services Platform, The Internet of Flying Things," retrieved from https://www.altitudeangel.com/ on Aug. 25, 2016, 8 pp.

"What is Flarm?," retrieved from http://flam.com/ on Aug. 25, 2016, 3 pp.

Lin et al., "Quasi-ADS-B Based UAV Conflict Detection and Resolution to Manned Aircraft," Hindawi Publishing Corporation, Journal of Electrical and Computer Engineering, vol. 2015, Feb. 24, 2015, 13 pp.

Osborn, "Air Force's New Unmanned Strategy Has F-35 Pilots Flying Drones," www.military.com, May 19, 2015, 3 pp.

Yao-Jun et al., "Multi-source Information Fusion for Sense and Avoidance of UAV," Proceedings of the 29th Chinese Control Conference, Jul. 29-31, 2010, 6 pp.

Prosecution History from U.S. Appl. No. 15/247,555, dated Sep. 12, 2018 through Apr. 26, 2019, 40 pp.

Examination Report from counterpart European Application No. 17185203.1, dated Apr. 21, 2021, 9 pp.

Response to Examination Report dated Apr. 21, 2021, from counterpart European Application No. 17185203.1, filed Aug. 23, 2021, 10 pp.

* cited by examiner

UNMANNED VEHICLE PROXIMITY WARNING SYSTEM

This application is a continuation of U.S. patent application Ser. No. 15/247,555, filed on Aug. 25, 2016, the entire content of which is incorporated by reference herein.

TECHNICAL FIELD

This disclosure relates to preventing collision with unmanned vehicles.

BACKGROUND

A vehicle may use an onboard weather radar system to detect adverse weather conditions, which may enable the vehicle crew to make changes to the route as necessary to avoid potentially hazardous weather. The onboard weather radar system may be mounted on the vehicle and may use radar scans to detect reflected radar signals from weather formations such as convective weather cells associated with turbulence, rain, lightning, hail, or other such weather conditions. Up-to-date weather information may assist the vehicle crew in evaluating whether or how to modify a route to avoid certain weather cells, as well as to promote fuel efficiency, time efficiency, and passenger comfort. The onboard weather radar system may control weather radar scanning and may process radar return signals to present a visual weather radar display.

A vehicle in flight may also receive weather data from, and transmit weather data to, other sources such as ground-based weather radar stations, which may help identify convective weather regions or other emerging hazards for operations. Traffic control systems track positions and velocity of vehicles and help control vehicle positions within the vicinity of hubs such as airports. Traffic control may be based on radar surveillance, and may also be supplemented with cooperative radio surveillance techniques, such as techniques using automatic dependent surveillance-broadcast (ADS-B) systems.

SUMMARY

In one example, a traffic control system comprises a transceiver configured to receive a first signal comprising location data indicating a location of an unmanned vehicle (UV). The traffic control system further comprises a processor configured to determine a location of a second vehicle and determine a course of the second vehicle. The processor is further configured to cause, based on determining the location of the second vehicle and the course of the second vehicle, the transceiver to transmit a second signal to the UV directing the UV to avoid the course of the second vehicle.

In another example, a system on a UV comprises a transceiver configured to receive location data indicating a location of the UV and a course of the UV, transmit a first signal indicating the location data to a second vehicle, and receive a second signal directing the UV to avoid a course of the second vehicle. The system on the UV further comprises a processor configured to cause the UV to avoid the course of the second vehicle based on receiving the second signal from the second vehicle.

Another example is directed to a method for controlling a UV comprising receiving a first signal comprising location data indicating a location of the UV, determining a location of a second vehicle, and determining a course of the second vehicle. The method further comprises transmitting, based on determining the location of the second vehicle and the course of the second vehicle, a second signal to the UV directing the UV to avoid the course of the second vehicle.

The details of one or more examples are set forth in the accompanying drawings and the description below. Other features, objects, and advantages will be apparent from the description and drawings, and from the claims.

DETAILED DESCRIPTION

Unmanned vehicles (UVs) operating in the vicinity of other vehicles such as passenger aircraft or other unmanned UVs pose a threat of collision. The other vehicles may not be able to detect UVs because UVs typically do not carry traffic collision avoidance system (TCAS). UVs also may not show up in most weather radar using standard operations in weather mode. This disclosure describes techniques for communicating the location of UVs to other vehicles to prevent collisions.

A UV proximity warning system of this disclosure may use existing weather radar in vehicles to identify UVs flying within a certain range, such as five miles. The UVs may transmit signals in the weather radar frequency band, where the signals include data about the location of each UV. A vehicle may transmit a second signal to a. UV directing the UV to avoid the course of the vehicle. The UV proximity warning system may employ existing hardware with software upgrades to implement the techniques of this disclosure.

Figure 1:
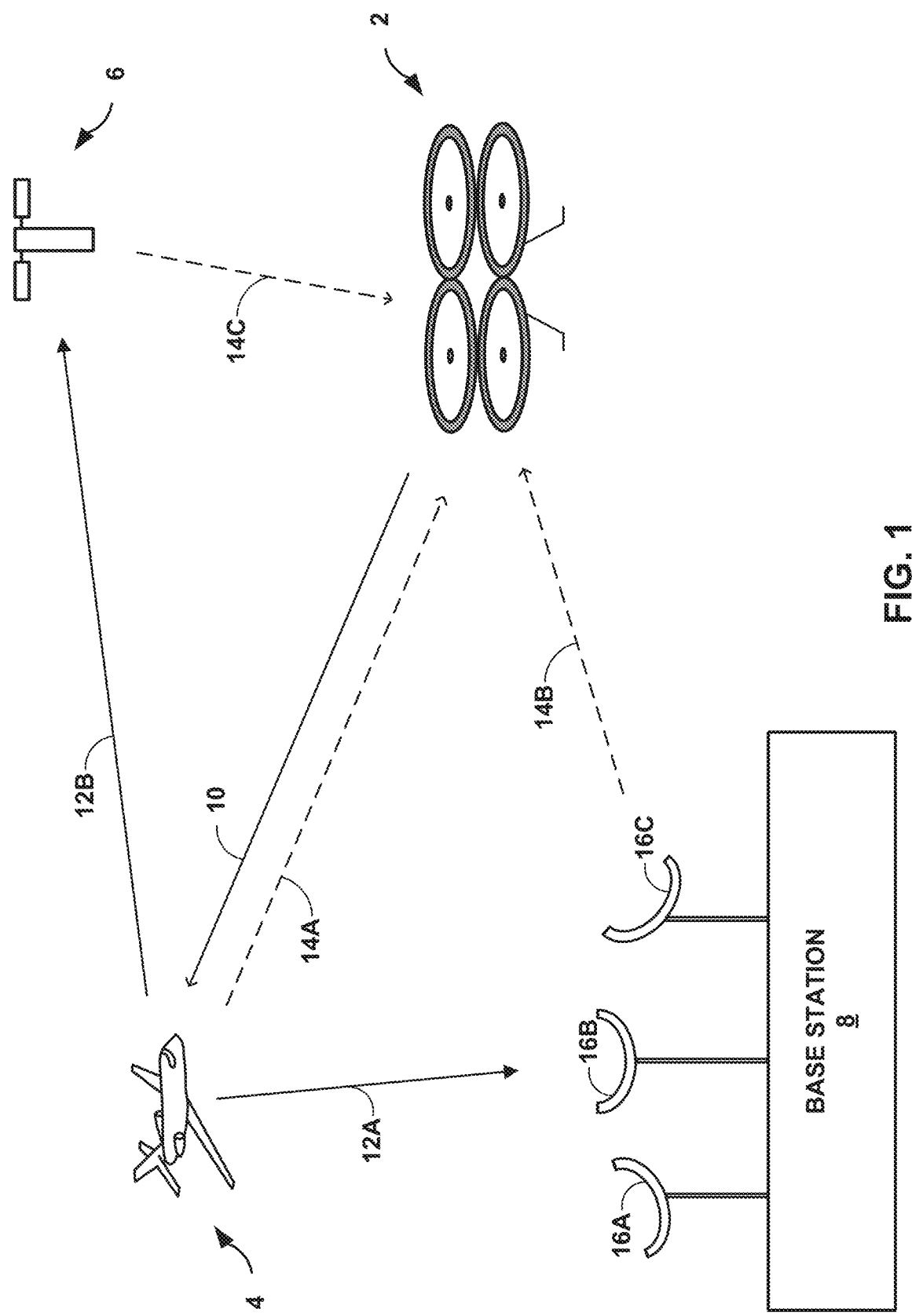
FIG. 1 depicts an unmanned vehicle (UV), a second vehicle, a satellite, and a base station, in accordance with some examples of this disclosure.

FIG. 1 depicts an UV 2, a second vehicle 4, a satellite 6, and a base station 8, in accordance with some examples of this disclosure. FIG. 1 depicts UV 2 as an aerial vehicle and vehicle 4 as an airplane, but either UV 2 or vehicle 4 may be any mobile object or remote object that can transmit and receive signals. In some examples, UV 2 or vehicle 4 may be an aircraft such as a helicopter or a weather balloon. UV 2 or vehicle 4 may also be a land vehicle such as an automobile or a water vehicle such as a ship or a submarine.

UV 2 may be configured to receive location data indicating a location of UV 2. UV 2 may include a Global Positioning System (GPS) or any other suitable means for determining location. UV 2 may include a transceiver configured to transmit and receive signals with vehicle 4, satellite 6, and base station 8, UV 2 may be a drone, a remote control vehicle, or any suitable vehicle without any pilot or crew on board.

UV 2 may include a processor for performing operations on data. The processor in UV 2 may receive and decode instructions from a remote pilot, controller, or home base.

The pilot or controller of UV 2, whether human or machine, may be nearby or a large distance from UV 2. UV 2 may have a home location that may correspond to the launch point or start point for UV 2. The home location of UV 2 may be a garage, a hangar, a harbor, or the location of the remote controller of UV 2. The processor in UV 2 may control the flight pattern and direction based on signal from the remote controller of UV 2. As described herein, a processor may include one or more processors.

Vehicle 4 may be a manned vehicle with a human pilot on board or an UV similar to UV 2. Vehicle 4 may include a transceiver configured to transmit and receive signals with vehicle 4, satellite 6, and base station 8. Vehicle 4 may include a processor for performing operations on data. The processor in vehicle 4 may determine the location, the speed, the velocity, and the course of vehicle 4 using, for example, satellite navigation. The processor in vehicle 4 may determine the course of vehicle 4 using the current trajectory of vehicle 4 along with the flight plan and destination of vehicle 4.

Satellite 6 may be a machine in orbit around the Earth at an altitude of more than one hundred thousand feet. Satellite 6 may include a transceiver configured to transmit and receive signals with UV 2, vehicle 4, and base station 8. Satellite 6 may include a processor for performing operations on data.

Base station 8 may include antennas 16A-16C for transmitting and receiving signals with UV 2, vehicle 4, satellite 6, and other objects. Base station 8 may be a building on land or equipment on a seaborne vessel or satellite. Base station 8 may receive data indicating traffic and weather conditions for UV 2, vehicle 4, and other vehicles. Base station 8 may include a transceiver configured to transmit and receive signals with UV 2, vehicle 4, and satellite 6. Base station 8 may include a processor for performing operations on data. In some examples, base station 8 may compile and transmit traffic data and/or weather data to subscribing vehicles.

The transceiver in UV 2 may be configured to transmit first signal 10 to vehicle 4. First signal 10 may contain location data indicating the location of UV 2. The transceiver in vehicle 4 may receive first signal 10 and deliver the location data to the processor in vehicle 4.

Vehicle 4 may transmit signals 12A, 12B to satellite 6 and base station 8. Signals 12A, 12B may contain the location data of UV 2 that vehicle 4 received in first signal 10. Satellite 6 and base station 8 may receive signals 12A, 12B and the processor in satellite 6 and base station 8 may decode and store the data in signals 12A, 12B.

In accordance with the techniques of this disclosure, transceiver in vehicle 4 may transmit second signal 14 to UV 2 directing UV 2 to avoid the course of vehicle 4. The transceiver in UV 2 may be configured to receive and deliver second signal 14 to the processor in UV 2. The processor in UV 2 may cause UV 2 to avoid the course of vehicle 4 based on receiving second signal 14 from vehicle 4. Second signal 14 may be referred to as a "buzz-off signal" because a system in vehicle 4 is able to direct UV 2 to buzz-off, or avoid, the path of vehicle 4. In some examples, satellite 6 and/or base station 8 may transmit second signals 14B, 14C, which direct UV 2 to avoid the course of vehicle 4.

By sending the buzz-off signal, the system in vehicle 4 may prevent a potential collision between vehicle 4 and UV 2. A collision between UV 2 and vehicle 4 could result in a total loss of the value of both UV 2 and vehicle 4, as well as injuries or fatalities for anyone on board vehicle 4.

Figure 2:
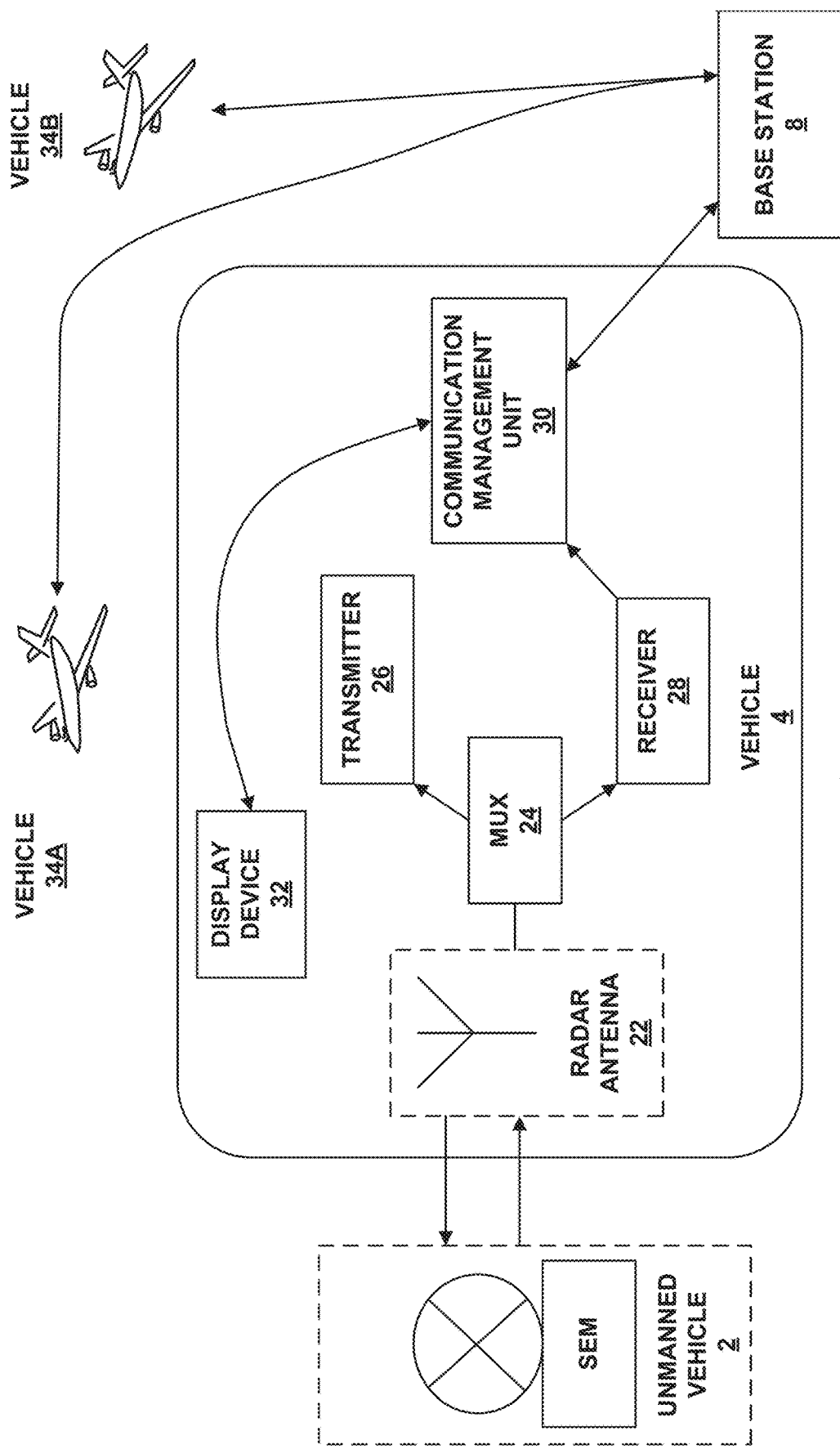
FIG. 2 depicts a conceptual block diagram of a transceiver in a vehicle, in accordance with some examples of this disclosure.

FIG. 2 depicts a conceptual block diagram of a transceiver in a vehicle 4, in accordance with some examples of this disclosure. The transceiver in vehicle 4 may include radar antenna 22, multiplexer 24, transmitter 26, and receiver 28.

Radar antenna 22 may transmit and receive signals at a specified frequency or within a frequency band, such as a frequency band for weather radar. The weather radar frequency band may extend from eight gigahertz to twelve gigahertz or twelve thousand and five hundred megahertz. In some examples, the frequency band of operation for radar antenna may be narrowed to between nine thousand and three hundred megahertz and nine thousand and four hundred megahertz. Radar antenna 22 may include a parabolic reflector antenna, a directional receiver antenna, a slotted waveguide antenna, phased array antenna, or any other suitable antenna.

Multiplexer 24 may connect radar antenna 22 to transmitter 26 and receiver 28. Multiplexer 24 may be a circuit or device that, based on an input signal, selects one of transmitter 26 or receiver 28 to connect to radar antenna 22. Multiplexer 24 may allow transmitter 26 and receiver 28 to share a single radar antenna 22.

Transmitter 26 may produce radio waves for output on radar antenna 22. Transmitter 26 may generate an alternating current with a frequency in the weather radar frequency range and/or weather radar frequency band. Radar antenna 22 may transmit signals outward from vehicle 4 to detect weather conditions in the surrounding space. Particles in the surrounding space may reflect the radar signals back to vehicle 4.

Receiver 28 may receive radio waves through radar antenna 22. The received radio waves may include the reflected weather radar signals generated by transmitter 26. The weather radar signals may indicate the reflectivity of areas within the space surrounding vehicle 4. Receiver 28 may also receive, via radar antenna 22, signals from UV 2. The signals from UV 2 may include a signature for UV 2 and a specific embedded message (SEM) for UV 2. The SEM for UV 2 may include location data indicating a location of UV 2. The location data may include a latitude of UV 2, a longitude of UV 2, an altitude of UV 2, a speed and/or velocity of UV2, and details of telemetry network of UV 2. The telemetry network of UV 2 may indicate the home location of UV 2, as well as other identifying information for UV 2. In some examples, the location data may include information relating to the course, route, speed, and heading of UV 2.

UV 2 may implement a system for transmitting location data to vehicle 4, making UV 2 a "friend" UV. If UV 2 has not implemented a system for transmitting location data to vehicle 4, UV 2 may be referred to as a "rogue" UV. If UV 2 is a friend, UV 2 may transmit a SEM with location data to vehicle 4 after receiving weather radar signals transmitted by vehicle 4. If UV 2 is a rogue, vehicle 4 may determine the location of UV 2 through the reflection of weather radar signals. Vehicle 4 may determine the location of a rogue UV by communicating with base station 8, which may have received a report from another vehicle that determined the location of the rogue UV. A rogue UV may not detect or obey a buzz-off signal, so vehicle 4 may perform an evasive maneuver to avoid UV 2.

Communication management unit (CMU) 30 may be electrically coupled to receiver 28, which may control communication with base station 8 and display device 32. CMU 30 may receive the location data from receiver 28 and process the location data. CMU 30 may include a processor for performing data operations on the location data. CMU 30 may transmit the location to base station 8, which may be a Global Data Center® (GDC) offered by Honeywell, Inc. of Morris Plains, N.J. GDC transmits weather data and traffic data to subscribing vehicles such as vehicles 34A, 34B, some of which may not have onboard weather radar. GDC may use the infrastructure of a connected weather radar concept for consolidation and sharing of data from multiple vehicles. To implement the techniques of this disclosure, CMU 30 may include a software update to interpret the signals received by radar antenna 22 from UV 2.

Display device 32 may be communicatively coupled to CMU 30 by a wired connection or a wireless connection. Display device 32 may include a monitor in the cockpit or passenger cabin of vehicle 4. Display device 32 may include a handheld display device such as a laptop computer, a tablet, or a mobile phone. The driver or pilot of vehicle 4 may view the location data on display device 32. A passenger or a user outside of vehicle 4 may also view the location data on display device 32. Display device 32 may present the relative location of UV 2 to a user, along with an indication of whether UV 2 is a friend or rogue.

In some examples, vehicle 4 may include a buzz-off button to allow the driver, pilot, or another member of the crew of vehicle 4 to direct UV 2 to avoid the course of vehicle 4. When pushed, the buzz-off button may cause transmitter 26 to transmit a signal to UV 2. UV 2 may include a system for receiving the signal and causing UV 2 to avoid the course of vehicle 4. The buzz-off button may be located on or near display device 32 in vehicle 4, or the buzz-off button may be located outside of vehicle 4.

Figure 3:
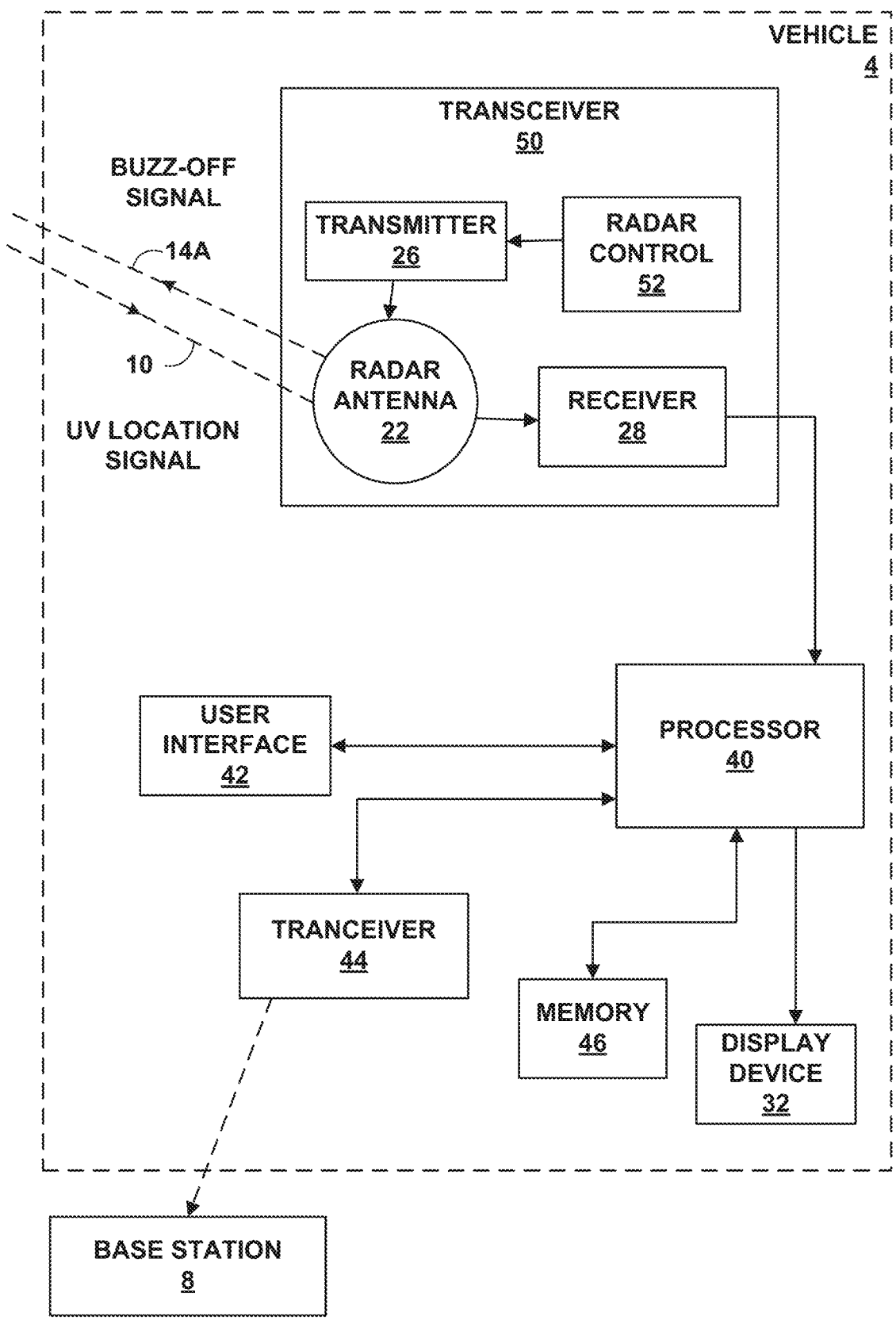
FIG. 3 depicts a conceptual block diagram of two transceivers and a processor in a vehicle, in accordance with some examples of this disclosure.

FIG. 3 depicts a conceptual block diagram of two transceivers 44, 50 and a processor 40 in a vehicle 4, in accordance with some examples of this disclosure. Transceiver 50 may include radar antenna 22, transmitter 26, receiver 28, and radar control 52. In some examples, transceiver 50 and transceiver 44 may include a single transceiver, two transceivers, or more than two transceivers configured to transmit buzz-off signal 14A, receive UV location signal 10, and communicate with base station 8. In some examples, transceiver 50 and/or transceiver 44 may be configured to communicate with other vehicles through a protocol such as automatic dependent surveillance-broadcast (ADS-B).

Radar control 52 may include a processor configured to generate and deliver signals to transmitter 26. Radar control 52 may be configured to generate buzz-off signal 14A with a frequency that a UV can receive and interpret. Radar control 52 may be configured to generate weather radar signals for determining the reflectivity of areas in the space surrounding vehicle 4. In some examples, radar control 52 and processor 40 may include a single processor or set of processors configured to generate buzz-off signal 14A, generate weather radar signals, and interact with user interface 42, transceiver 44, memory 46, and display device 32.

Receiver 28 may include weather mode, which may not detect UVs, and unmanned vehicle proximity warning system (UVPWS) mode, which may detect UV along with weather. Using the techniques of this disclosure, receiver 28 may receive UV location signal 10 in weather mode.

Buzz-off signal 14A may direct UV 2 to avoid the course of vehicle 4. Buzz-off signal 14A may include data such as the latitude, longitude, altitude, and course of vehicle 4. Buzz-off signal 14A may include data indicating the destination of vehicle 4 and any future maneuvers by vehicle 4, Buzz-off signal 14A may include instructions for UV 2 to avoid the course of vehicle 4. The instruction may include a specific course for UV 2. Buzz-off signal 14A may override the standard operations of UV 2.

In response to receiving buzz-off signal 14A, UV 2 may perform an evasive maneuver to avoid the course of vehicle 4. In some implementations, buzz-off signal 14A may include information, such as location and course information, for vehicle 4, and based on that information, UV 2 may determine the nature of the evasive maneuver. For example, based on the location and course information supplied by vehicle 4 in buzz-off signal 14A, UV 2 may determine one or more of whether to slow down, speed up, increase or decrease altitude, or move in a latitudinal or longitudinal direction. In other implementations, vehicle 4 may determine the nature of the evasive maneuver for UV 2 and include information regarding the evasive maneuver in buzz-off signal 14A. In such an implementation, the determination of whether UV 2 should slow down, speed up, increase or decrease altitude, or move in a latitudinal or longitudinal direction may be made by vehicle 4, and instructions for carrying out the evasive maneuver determined by vehicle 4 may be transmitted to UV 2 from vehicle 4 as part of the buzz-off signal. In a similar manner, satellite 6 and/or base station 8 may determine the nature of an evasive maneuver for UV 2 and include information regarding the evasive maneuver in buzz-off signal 14B or 14C.

User interface 42 may generate an alert to a driver, pilot, or crew of vehicle 4 based on a signal from processor 40. The alert may be audible, visual, and/or any other suitable alert to notify a user that a UV is nearby. User interface 42 may also include a buzz-off button, which is an input device for a user to communicate to a UV to avoid the course of vehicle 4.

Transceiver 44 may communicate with base station 8 about the location of UVs. Through transceiver 44, processor 40 may receive information about the location of UVs detected by other vehicles. Transmitter 44 may transmit location data received through UV location signal 10 to base station 8.

Memory 46 may store data indicating geography, maps, flight plans, and current and previous locations of UVs. Memory 46 may store data relating to trajectory propagation for determining if vehicle 4 and a UV are likely to collide. Memory 46 may also store data relating to protocols such as FLARM (flight-alarm), which is an electronic system to alert pilots of potential collisions, Digital Notice and Awareness System (D-NAS), which includes route planning and encrypted digital notices, or Altitude Angel.

Figure 4:
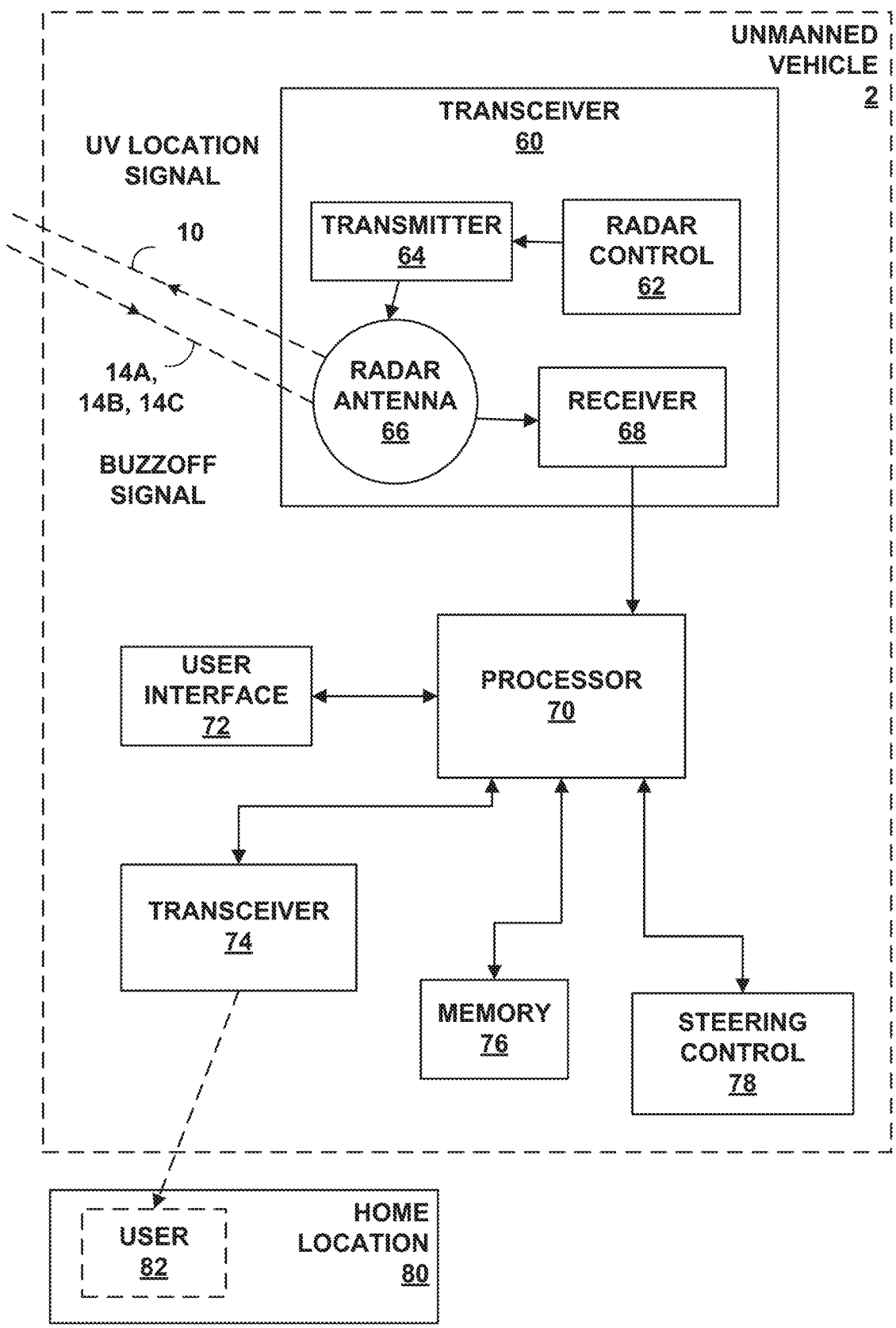
FIG. 4 depicts a conceptual block diagram of two transceivers and a processor in a UV, in accordance with some examples of this disclosure.

FIG. 4 depicts a conceptual block diagram of two transceivers 60, 74 and a processor 70 in a UV 2, in accordance with some examples of this disclosure. Transceiver 60 may include radar control 62, transmitter 64, receiver 68, and radar antenna 66. In some examples, transceiver 60 and transceiver 74 may include a single transmitter configured to transmit UV location signal 10, receive buzz-off signal 14A, and communicate with user 82. In some examples, transceiver 60 and/or transceiver 74 may be configured to communicate with other vehicles through a protocol such as automatic dependent surveillance-broadcast (ADS-B).

Radar control 62 may include a processor configured to generate and deliver signals to transmitter 64. Receiver 68 may receive a weather radar signal through radar antenna 66 from another vehicle. After receiving the weather radar signal, radar control 62 may be configured to generate UV location signal 10 that includes a SEM with a frequency that a vehicle can receive on weather radar. Radar control 62 may be configured to receive buzz-off signals 14A-14C from vehicles, satellites, and/or base stations. In some examples, radar control 62 and processor 70 may include a single processor or set of processors configured to generate UV location signal 10, receive buzz-off signals 14A-14C, and interact with user interface 72, transceiver 74, memory 76, and steering control 78.

User interface 72 may generate an alert to user 82 through transceiver 74 based on a signal from processor 70. The alert may be audible, visual, and/or any other suitable alert to notify user 82 that UV 2 has received one of buzz-off signals 14A-14C, or that some other event has occurred. User interface 72 may also include a remote control at home location 80, through which user 82 may control UV 2. User 82 may include a human or a machine.

Transceiver 74 may communicate with user 82 about the location of UV 2 and the receipt of buzz-off signals 14A-14C. Through transceiver 74, processor 70 may receive commands from user 82. Transmitter 74 may transmit location data for UV 2 to user 82.

Memory 76 may store data indicating geography, maps, and current and previous locations of UV 2. Memory 76 may store instructions for decoding and executing commands from user 82. Memory 76 may also store data relating to protocols such as FLARM (flight-alarm), Digital Notice and Awareness System D-NAS), or Altitude Angel, which provides traffic management for UVs.

Steering control 78 may control the propulsion of UV 2. Processor 70 may execute commands from user 82 by directing steering control to propel or refrain from propelling UV 2 in a certain direction.

Home location 80 may be a point on the surface of the earth or in a vehicle or satellite. In some examples, home location 80 may be located where UV 2 begins or ends a route. When radar antenna 66 receives one of buzz-off signals 14A-14C, processor 70 may direct steering control 78 to propel UV 2 to home location 80. In some examples, processor 70 may direct steering control 78 to propel UV 2 in another direction if propelling UV 2 towards home location 80 would place UV 2 in the course of another vehicle.

Figure 5:
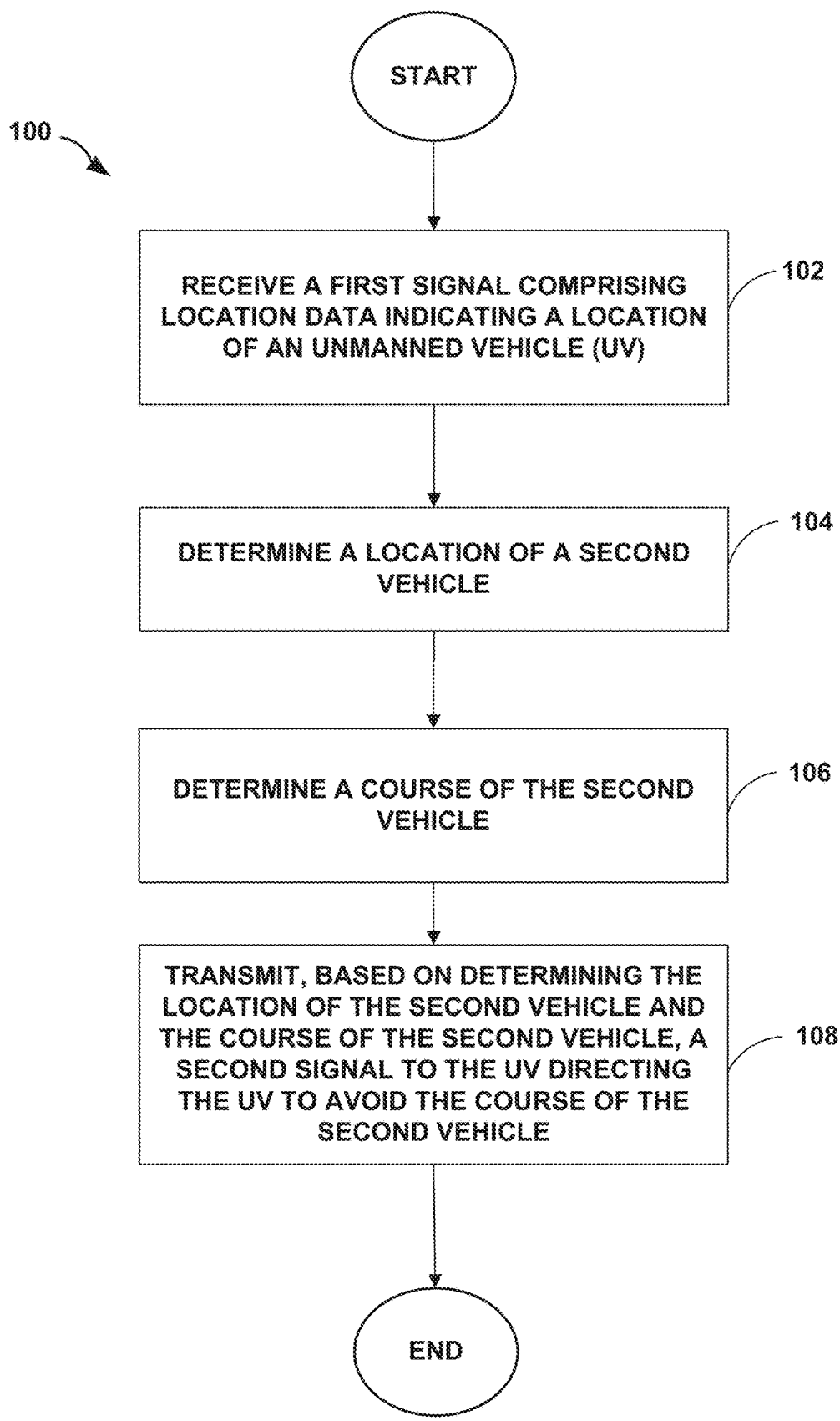
FIG. 5 shows a flowchart for an example technique for directing a UV to avoid the course of a second vehicle, in accordance with some examples of this disclosure.

FIG. 5 shows a flowchart for an example technique 100 for preventing collisions between vehicles and UVs, in accordance with some examples of this disclosure. Technique 100 is described with reference to the system of FIG. 1, including UV 2 and vehicle 4, although other components, such as UV 2 and vehicle 4 in FIG. 2, vehicle 4 in FIG. 3, and UV 2 in FIG. 4, may perform similar techniques.

The technique of FIG. 5 includes receiving first signal 10 comprising location data indicating a location of UV 2 (102). UV 2 may transmit first signal 10 with a frequency in the frequency band of the weather radar on vehicle 4. Vehicle 4 may receive first signal 10 through a weather radar system and decode first signal 10 to determine the location of UV 2.

The technique of FIG. 5 further includes determining a location of vehicle 4 (104) and determining a course of vehicle 4 (106). Vehicle 4 may determine location and course from ADS-B reports or TCAS surveillance data received by vehicle 4. Vehicle 4 may use onboard equipment such as a compass or sensors to determine the location and course of vehicle 4.

The technique of FIG. 5 further includes transmitting, based on determining the location of vehicle 4 and the course of vehicle 4, second signal 14A to UV 2 directing UV 2 to avoid the course of vehicle 4 (108). If vehicle 4 determines that there is a threat of collision between UV 2 and vehicle 4, vehicle 4 may transmit a buzz-off signal, such as second signal 14A to UV 2. In some examples, satellite 6 or base station 8 may transmit the buzz-off signal as signals 14B, 14C.

The following examples may illustrate one or more of the techniques of this disclosure.

Example 1

A traffic control system comprising a transceiver configured to receive a first signal comprising location data indicating a location of an unmanned vehicle (UV). The traffic control system further comprises a processor configured to determine a location of a second vehicle and determine a course of the second vehicle. The processor is further configured to cause, based on determining the location of the second vehicle and the course of the second vehicle, the transceiver to transmit a second signal to the UV directing the UV to avoid the course of the second vehicle.

Example 2

The traffic control system of example 1, wherein a frequency of the first signal is in a weather radar frequency band, and the transceiver is configured to transmit and receive weather radar signals.

Example 3

The traffic control system of example 1 or 2, wherein the weather radar frequency band comprises frequencies between eight gigahertz and twelve gigahertz.

Example 4

The traffic control system of any one of examples 1 to 3, wherein the second vehicle comprises the system, and the processor is configured to determine a speed of the second vehicle and cause the transceiver to transmit the second signal to the UV based on determining the speed of the second vehicle. The transceiver is further configured to transmit the location data to a base station or a satellite.

Example 5

The traffic control system of any one of examples 1 to 4, wherein a base station comprises the system, and the transceiver is further configured to transmit the location data to a third vehicle.

Example 6

The traffic control system of any one of examples 1 to 5, further comprising a display device, wherein the processor is further configured to cause the display device to present an indication of the location of the UV.

Example 7

The traffic control system of any one of examples 1 to 6, further comprising a user interface, wherein the processor is further configured to cause the user interface to generate an alert based on the location of the UV and the course of the second vehicle.

Example 8

The traffic control system of any one of examples 1 to 7, wherein the processor is configured to cause the transceiver to transmit the second signal directing the UV to return to a home location of the UV.

Example 9

The traffic control system of any one of examples 1 to 8, wherein the location data comprises a latitude of the UV, a longitude of the UV, an altitude of the UV, a speed of the UV, and a telemetry network of the UV.

Example 10

The traffic control system of any one of examples 1 to 9, wherein the location data further comprises a course of the UV.

Example 11

The traffic control system of any one of examples 1 to 10, wherein the transceiver is configured to transmit weather radar signals and receive reflected weather radar signals indicating a reflectivity of an area in a space surrounding the second vehicle.

Example 12

A system on a UV comprising a transceiver configured to receive location data indicating a location of the UV and a course of the UV, transmit a first signal indicating the location data to a second vehicle, and receive a second signal directing the UV to avoid a course of the second vehicle. The system on the UV further comprises a processor configured to cause the UV to avoid the course of the second vehicle based on receiving the second signal from the second vehicle.

Example 13

The system on the UV of example 12, wherein a frequency of the first signal is in a weather radar frequency band.

Example 14

The system on the UV of example 12 or 13, wherein the transceiver is configured to receive the second signal from the second vehicle, a satellite, or a base station.

Example 15

The system on the UV of any one of examples 12 to 14, wherein the location data comprises a latitude of the UV, a longitude of the UV, an altitude of the UV, a speed of the UV, and a telemetry network of the UV.

Example 16

The system on the UV of example 15, wherein the telemetry network of the UV indicates a home location of the UV.

Example 17

The system on the UV of any one of examples 12 to 16, wherein a frequency of the first signal is in a weather radar frequency band comprising frequencies between eight gigahertz and twelve gigahertz.

Example 18

A method for controlling a UV comprising receiving a first signal comprising location data indicating a location of the UV, determining a location of a second vehicle, and determining a course of the second vehicle. The method further comprises transmitting, based on determining the location of the second vehicle and the course of the second vehicle, a second signal to the UV directing the UV to avoid the course of the second vehicle.

Example 19

The method of example 18, wherein a frequency of the first signal is in a weather radar frequency band, the method further comprising transmitting weather radar signals and receiving weather radar signals.

Example 20

A method of example 18 or 19, wherein transmitting the second signal to the UV directing the UV to avoid the course of the second vehicle comprises transmitting the second signal directing the UV to return to a home location of the UV.

Example 21

A method of any one of examples 18-20, wherein the location data comprises a latitude of the UV, a longitude of the UV, an altitude of the UV, and a telemetry network of the UV.

Vehicle 4 and/or its components or features, including CMU 30, display device 32, processor 40, user interface 42, radar control 52, and/or other components or features thereof, may include one or more processors. A processor may comprise any suitable arrangement of hardware, software, firmware, or any combination thereof, to perform the techniques attributed to vehicle 4 and/or any of its components or features described herein. In some examples, "a processor" may include one or more processors. For example, the processor may include any one or more of microprocessors, digital signal processors (DSPs), application specific integrated circuits (ASICs), field programmable gate arrays (FPGAs), or any other equivalent integrated or discrete logic circuitry, as well as any combinations of such components. Vehicle 4 and/or its components or features (e.g., CMU 30) may also include a memory which can include any volatile or non-volatile media, such as a RAM, ROM, non-volatile RAM (NVRAM), electrically erasable programmable ROM (EEPROM), flash memory, and the like. The memory may store computer readable instructions that, when executed by the processor of vehicle 4 and/or its components or features cause the processors to implement functions and techniques attributed herein to vehicle 4 and/or its components or features.

Elements of vehicle 4 and/or its components or features as disclosed above may be implemented in any of a variety of additional types of solid state circuit elements, such as central processing units (CPUs), application-specific integrated circuits (ASICs), a magnetic nonvolatile random-access memory (RAM) or other types of memory, a mixed-signal integrated circuit, a field programmable gate array (FPGA), a microcontroller, a programmable logic controller (PLC), a system on a chip (SoC), a subsection of any of the above, an interconnected or distributed combination of any of the above, or any other type of component or one or more components capable of being configured in accordance with any of the examples disclosed herein. Elements of vehicle 4 and/or its components or features may be programmed with various forms of software. Elements of vehicle 4 and/or its components or features as in any of the examples herein may be implemented as a device, a system, an apparatus, and may embody or implement a method of combining air traffic surveillance data, including for implementing example technique 100 as described with reference to FIG. 5.

A "vehicle" or an "aircraft" as described and claimed herein may be or include any fixed-wing or rotary-wing aircraft, airship (e.g., dirigible or blimp buoyed by helium or other lighter-than-air gas), suborbital spaceplane or reusable launch vehicle stage, spacecraft, or other type of flying device, and may be crewed or uncrewed (e.g., unmanned aerial vehicle (UAV) or flying robot). While some description uses the example of ADS-B radio surveillance data, other examples may use extensions or modifications to ADS-B, or other forms of ADS-B-like radio surveillance, or ADS-C or any kind of radio surveillance data, in any manner described in terms of the example of ADS-B data in the description herein.

Any of the systems of the examples of FIGS. 1-4 as described above, or any component thereof, may be implemented as a device, a system, an apparatus, and may embody or implement a method of implementing a method for determining modified protection volumes, including for implementing example technique 100 as described with reference to FIG. 5. Various illustrative aspects of the disclosure are described above. These and other aspects are within the scope of the following claims.

What is claimed is:

1. A system configured to mount on an unmanned vehicle (UV) comprising:
a transceiver configured to:
receive location data indicating a location of the UV and a course of the UV;
transmit a first signal indicating the location data to a second vehicle, wherein the location data includes an identification of a home location of the UV, wherein the location data is encoded in the first signal in a weather radar frequency band comprising frequencies between eight gigahertz and twelve gigahertz; and
receive, from the second vehicle, a second signal directing the UV to return to the home location and avoid a course of the second vehicle; and
a processing circuitry configured to:
determine that moving towards the home location of the UV would place the UV in the course of the second vehicle; and
cause the UV to move in another direction in response to determining that moving towards the home location would place the UV in the course of the second vehicle.

2. The system of claim 1, wherein the location data comprises a latitude of the UV, a longitude of the UV, an altitude of the UV, a speed of the UV, and a telemetry network of the UV.

3. The system of claim 1, wherein the location data is encoded in the first signal at frequencies between 9.3 gigahertz and 9.4 gigahertz.

4. The system of claim 1, wherein the processing circuitry is configured to:
receive commands from a user via the transceiver; and
cause the transceiver to communicate to a user that the transceiver has received the second signal.

5. The system of claim 1,
wherein a location or the course of the second vehicle is encoded in the second signal,
wherein the processing circuitry is configured to determine an evasive maneuver for the UV based on the location or the course of the second vehicle encoded in the second signal, and
wherein to cause the UV to move in another direction, the processing circuitry is configured to cause the UV to perform the evasive maneuver.

6. The system of claim 1,
wherein the processing circuitry is configured to determine whether to increase or decrease altitude based on information indicated in the second signal, and
wherein to cause the UV to move in another direction, the processing circuitry is configured to cause the UV to increase or decrease altitude as determined based on the information indicated in the second signal.

7. The system of claim 1, wherein the processing circuitry is configured to:
determine that, in a separate instance, moving towards the home location of the UV would not place the UV in the course of the second vehicle; and
cause the UV to move towards the home location in response to determining that, in the separate instance, moving towards the home location would not place the UV in the course of the second vehicle.

8. A method comprising:
receiving, by a processing circuitry from a transceiver onboard a UV, location data indicating a location of the UV and a course of the UV;
causing, by the processing circuitry, the transceiver to transmit a first signal indicating the location data to a second vehicle, wherein the location data includes an identification of a home location of the UV, wherein the location data is encoded in the first signal in a weather radar frequency band comprising frequencies between eight gigahertz and twelve gigahertz;
receiving, by the transceiver from the second vehicle, a second signal directing the UV to return to the home location and avoid a course of the second vehicle;
determining, by the processing circuitry, that moving towards the home location of the UV would place the UV in the course of the second vehicle; and
causing, by the processing circuitry, the UV to move in another direction in response to determining that moving towards the home location would place the UV in the course of the second vehicle.

9. The method of claim 8, wherein the location data comprises a latitude of the UV, a longitude of the UV, an altitude of the UV, a speed of the UV, and a telemetry network of the UV.

10. The method of claim 8, wherein the location data is encoded in the first signal at frequencies between 9.3 gigahertz and 9.4 gigahertz.

11. The method of claim 8, further comprising:
receiving commands from a user via the transceiver; and
causing the transceiver to communicate to a user that the transceiver has received the second signal.

12. The method of claim 8,
wherein a location or a course of the second vehicle is encoded in the second signal,
wherein the method further comprises determining an evasive maneuver for the UV based on the location or the course of the second vehicle encoded in the second signal, and
wherein causing the UV to move in another direction comprises causing the UV to perform the evasive maneuver.

13. The method of claim 8, further comprising determining whether to increase or decrease altitude based on information indicated in the second signal,
- wherein causing the UV to move in another direction comprises causing the UV to increase or decrease altitude as determined based on the information indicated in the second signal.

14. The method of claim 8, further comprising:
- determining that, in a separate instance, moving towards the home location of the UV would not place the UV in the course of the second vehicle; and
- causing the UV to move towards the home location in response to determining that, in the separate instance, moving towards the home location would not place the UV in the course of the second vehicle.

15. A device comprising a computer-readable medium having executable instructions stored thereon, configured to be executable by processing circuitry for causing the processing circuitry to:
- receive, from a transceiver onboard a UV, location data indicating a location of the UV and a course of the UV;
- cause the transceiver to transmit a first signal indicating the location data to a second vehicle, wherein the location data includes an identification of a home location of the UV, wherein the location data is encoded in the first signal in a weather radar frequency band comprising frequencies between eight gigahertz and twelve gigahertz;
- receive, from the transceiver from the second vehicle, a second signal directing the UV to return to the home location and avoid a course of the second vehicle;
- determine that moving towards the home location of the UV would place the UV in the course of the second vehicle; and
- cause the UV to move in another direction in response to determining that moving towards the home location would place the UV in the course of the second vehicle.

16. The device of claim 15, wherein the instructions are further configured to cause the processing circuitry to:
- receive commands from a user via the transceiver; and
- cause the transceiver to communicate to a user that the transceiver has received the second signal.

17. The device of claim 15,
- wherein a location or the course of the second vehicle is encoded in the second signal,
- wherein the instructions are further configured to cause the processing circuitry to determine an evasive maneuver for the UV based on the location or the course of the second vehicle encoded in the second signal, and
- wherein the instructions to cause the UV to move in another direction comprise instructions to cause the UV to perform the evasive maneuver.

18. The device of claim 15,
- wherein the location data comprises a latitude of the UV, a longitude of the UV, an altitude of the UV, a speed of the UV, and a telemetry network of the UV, and
- wherein the location data is encoded in the first signal at frequencies between 9.3 gigahertz and 9.4 gigahertz.

19. The device of claim 15,
- wherein the instructions are further configured to cause the processing circuitry to determine whether to increase or decrease altitude based on information indicated in the second signal, and
- wherein the instructions to cause the UV to move in another direction comprise instructions to cause the UV to increase or decrease altitude as determined based on the information indicated in the second signal.

20. The device of claim 15, wherein the instructions are further configured to cause the processing circuitry to:
- determine that, in a separate instance, moving towards the home location of the UV would not place the UV in the course of the second vehicle; and
- cause the UV to move towards the home location in response to determining that, in the separate instance, moving towards the home location would not place the UV in the course of the second vehicle.

\* \* \* \* \*